(12) United States Patent
Kashchenevsky

(10) Patent No.: US 6,367,977 B1
(45) Date of Patent: Apr. 9, 2002

(54) HYBRID HYDROSTATIC SPINDLE

(75) Inventor: Leonid Kashchenevsky, Stratford, CT (US)

(73) Assignee: Moore Tool Company Incorporated, Bridgeport, CT (US)

( * ) Notice: Subject to any disclaimer, the term of this patent is extended or adjusted under 35 U.S.C. 154(b) by 0 days.

(21) Appl. No.: 09/642,731

(22) Filed: Aug. 21, 2000

(30) Foreign Application Priority Data

Aug. 23, 1999 (IL) .................................................. 131526

(51) Int. Cl.[7] .............................................. F16C 32/06
(52) U.S. Cl. ......................................... 384/101; 384/99
(58) Field of Search .......................... 384/101, 99, 102, 384/100, 114

(56) References Cited

U.S. PATENT DOCUMENTS 3,642,331 A * 2/1972 Silver 5,272,403 A * 12/1993 New

* cited by examiner

Primary Examiner—Lenard A. Footland
(74) Attorney, Agent, or Firm—Bachman & LaPointe, P.C.

(57) ABSTRACT

The present invention relates to a spindle unit which is able two work both in a low speed powerful roughing regime and medium and high speed precision semi-finishing and finishing. The spindle unit includes a body, a shaft placed into the body, journal bearings between the body and the shaft, and at least one journal-thrust ball bearing assembly placed between the body and the shaft. A hydraulic or pneumatic cylinder is used to move the shaft in an axial direction. The spindle unit further has a pad placed on at least one side of the hydraulic or pneumatic cylinder. As a result of this construction, the spindle unit can work as a fully restricted spindle unit with and without additional ball bearing support.

10 Claims, 2 Drawing Sheets

HYBRID HYDROSTATIC SPINDLE

BACKGROUND OF THE INVENTION

The present invention belongs to the machine tools industry and mainly to precision machine tool manufacture. More particularly, the invention relates to an improved spindle unit for a machine tool.

One of the main tendencies in the modern industry of machine tools is the essential and constant growing of a spindle's maximal speed, especially in milling machine centers. The main problem is the contradiction between the spindle's speed range, its stiffness, and its life time. As a spindle's maximal speed becomes higher, its stiffness is lower. Thus, it is less suitable for roughing operations in the low speed range. The usage of high speed spindles for roughing will essentially reduce the roughing productivity and the spindle's life time. The present invention addresses and solves this contradiction.

SUMMARY OF THE INVENTION

Accordingly, it is an object of the present invention to provide a spindle unit capable of working in a low speed powerful roughing regime and in a medium and high speed precision semi-finishing and finishing regime.

The foregoing object is attained by the spindle unit of the present invention.

In accordance with the present invention, a spindle unit has a body, a shaft placed into the body, and journal bearings between the body and the shaft. At least one journal-thrust ball bearing assembly is placed between the body and the shaft. A cylinder, which is operated either hydraulically or pneumatically, is provided to move the shaft in an axial direction. Further, a pad is placed on at least one side of the cylinder and enables the spindle to work as a fully restricted spindle with and without additional ball bearing support.

Other details of the spindle unit of the present invention, as well as other objects and advantages attendant thereto, are set forth in the following detailed description and the accompanying drawing, in which like reference numerals depict like elements.

DETAILED DESCRIPTION OF THE PREFERRED EMBODIMENT(S)

Figure 1:
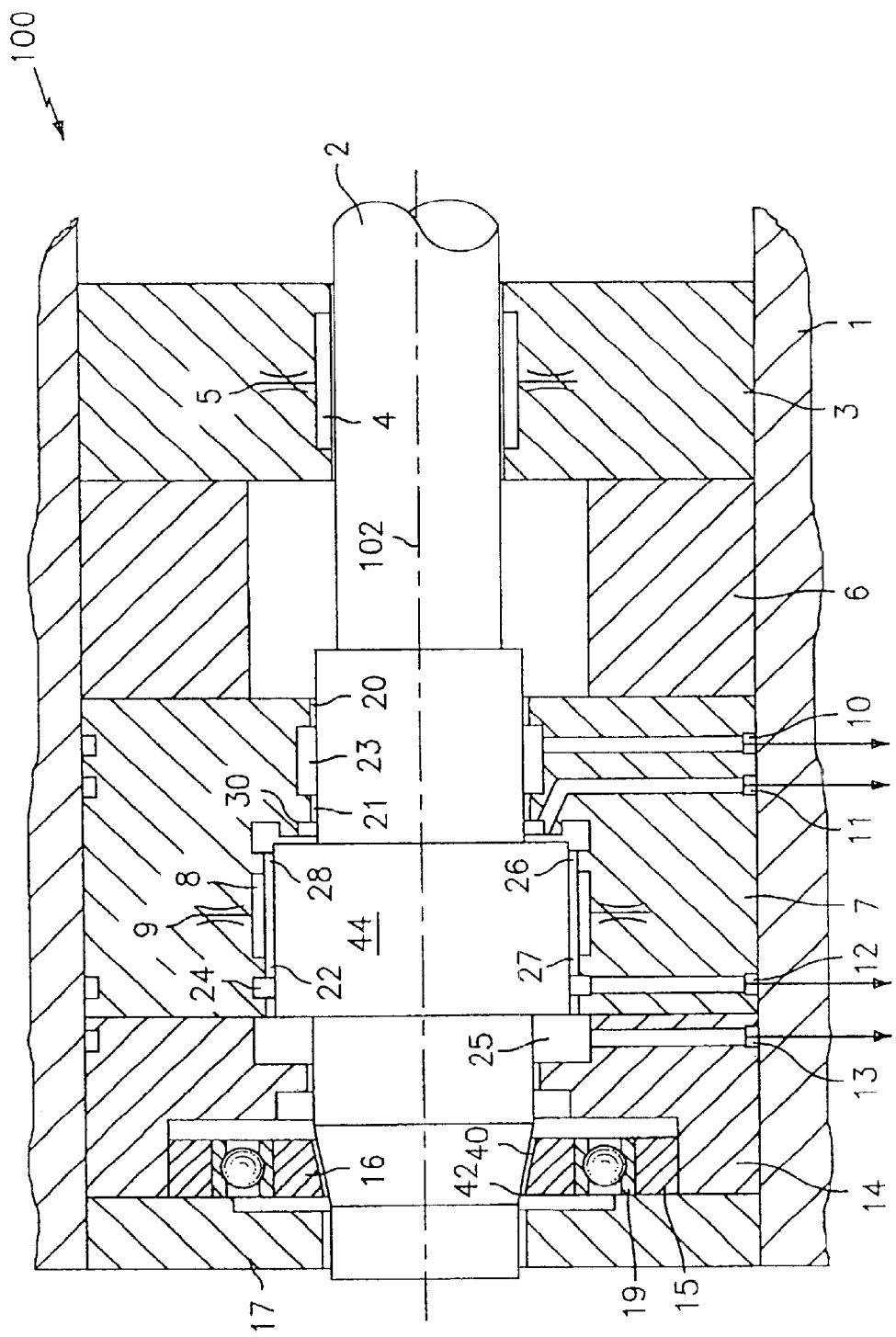
FIG. 1 is a sectional view of a spindle unit in accordance with the present invention.

Referring now to the FIG. 1, a spindle unit 100 is illustrated which is able to work in two different regimes: (a) low speed powerful roughing; and (b) medium and high speed precision semi-finishing and finishing. The spindle unit 100 includes a housing 1 and a shaft 2 positioned within the housing 1. The shaft is supported for rotational movement about an axis 102 and is connected to a tool (not shown) which is used for the grinding or milling. Any suitable means known in the art may be used to rotate the shaft 2. As shown in the FIG. 1, the shaft 2 is supported by a front journal bearing 8 and a rear journal bearing 4. The front journal bearing 8 is supported within a front bearing ring 7 and may comprise any suitable hydrostatic or air-static journal bearing known in the art. The rear journal bearing 4 is supported in the rear bearing ring 3 and also may comprise any suitable hydrostatic or air-static journal bearing known in the art. A spacer 6 is provided in the housing 1 to position the bearing rings 3 and 7 and hence separate the front and rear journal bearings by a desired distance.

The front journal bearing 8 communicates with a constant pressure source (not shown) via flow restrictors 9. Similarly, rear journal bearing 4 communicates with a constant pressure source (not shown) via flow restrictors 5.

A roller or ball bearing 19 is provided to allow the shaft 2 to rotate about the axis 102 and to further support the shaft 2. The ball bearing 19 may comprise any suitable ball or roller bearing known in the art. As shown in the FIG. 1, the ball bearing 19 includes a housing 15 which abuts a portion of the front bearing 8 and an inner ring 16. As can be seen from the FIG. 1, the shaft 2 has a tapered surface 42 which corresponds to the tapered surface 40 of the ring 16. A cover plate 17 is provided to ensure proper positioning of the ball bearing 19 within the housing 1.

Figure 2:
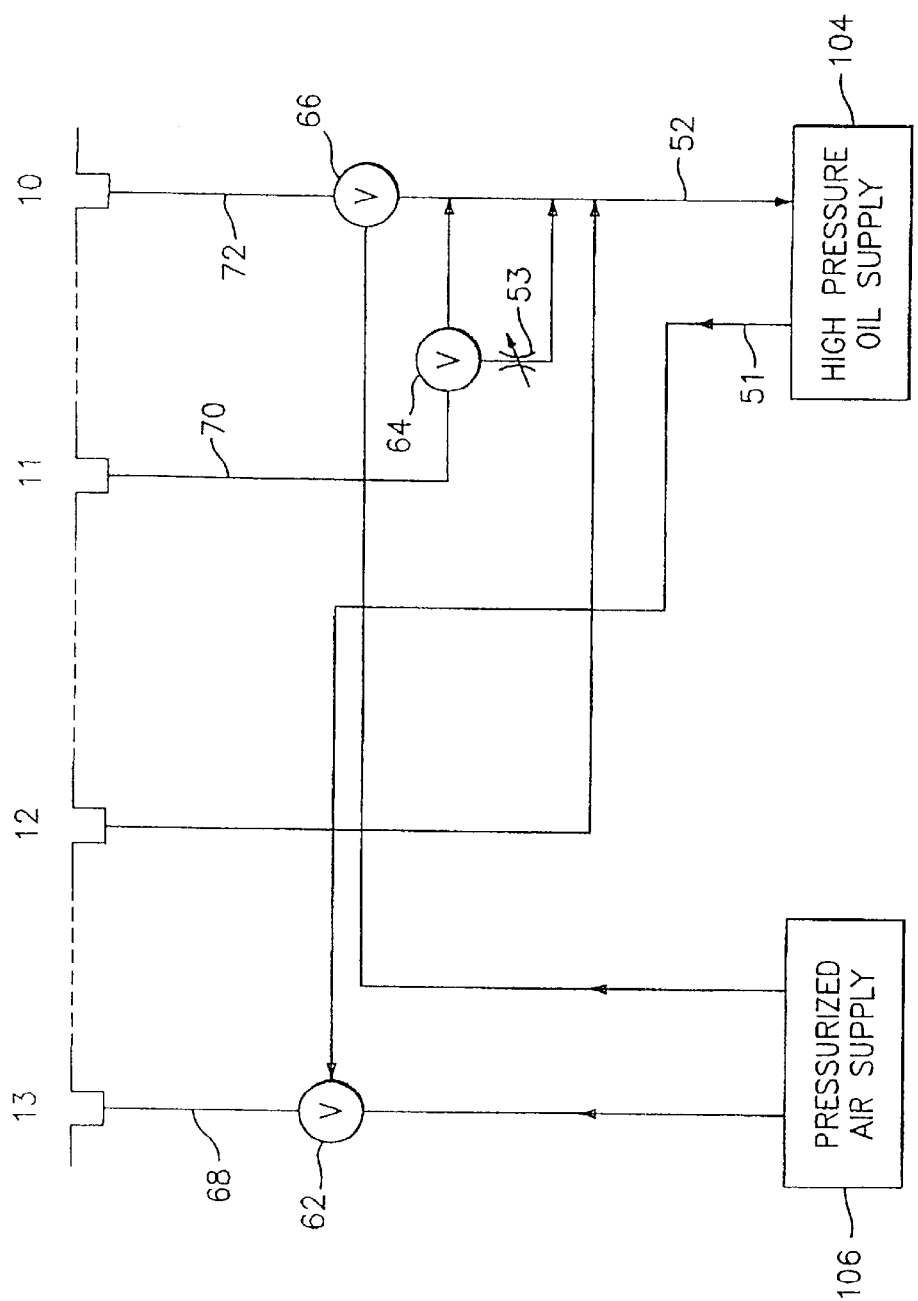
FIG. 2 is a schematic representation of a system for supplying fluid to the spindle unit of FIG. 1.

The spindle unit 100 is provided with a hydraulic or pneumatic cylinder for moving the shaft 2 along the axis 98. This fluid actuated drive system includes a series of fluid passageways 10, 11, 12, and 13 provided in the front bearing ring 7. As shown in FIG. 2, each of the passageways 10, 11, 12, and 13 communicates with a tank 104 of operating fluid, such as hydraulic fluid or oil, and/or a tank 106 of pressurized air via appropriate flow lines. Valves 62, 64, and 66 are provided in the flow lines 68, 70 and 72 to connect a respective fluid passageway 10, 11 or 13 to tank 104 and/or tank 106 or to simply close the passageway. Additionally, pumps (not shown) may be provided in the flow lines to provide either the operating fluid or air to the respective fluid passageway at a desired pressure level.

The fluid passageway 10 communicates with an area 23. The fluid passageway 11 communicates with a space or pad 26 via space 30. Still further, fluid passageway 12 communicates with a groove 24, while the fluid passageway 13 communicates with the space 25. The various spaces and grooves described herein are spaces and grooves between the front bearing ring and other portions of the spindle unit. As can be seen from the Figure, space 26 is positioned on one side of shaft portion 44 while space 25 is positioned on an opposite side of shaft portion 44. Table I shows the connections between fluid passageways 10, 11, 12, and 13 and tanks 104 and 106 during low speed operation and medium and high speed operation.

TABLE I

| | Low Speed | High Speed |
|---|---|---|
| Fluid Passageway 10 | Directly to oil tank's return line 52 | To air tank 106 |
| Fluid Passageway 11 | To oil tank's return line 52 through controlled restrictor 53 | Directly to oil tank's return line 52 |
| Fluid Passageway 12 | Directly to oil tank's return line 52 | Directly to oil tank's return line 52 |
| Fluid Passageway 13 | To air tank 106 | To oil tank's high pressure line 51 |

When the spindle unit 100 is used in the low speed roughing regime, the fluid passageway 10 is connected through line 72 and return line 52 to the tank 104, which preferably contains oil, and the outlet of the fluid passageway 11 is connected to return line 52 through line 70 and a controlled restrictor 53. The fluid passageway 13 is connected via line 68 to the tank 106 which contains pressurized air. Oil leaves recesses in the front hydrostatic bearing 7 via gaps 27 and 28. Through the gap 27, oil is conducted to a cylindrical groove 24 and flows back to the tank 104 via fluid passageway 12 and return line 52. Pressurized air enters the space 25 via the fluid passageway 13 and prevents oil leakage. Via the gap 28, oil leaves recesses (not shown) in journal bearing 8 and enters the space or pad 26. Because the outlet of the fluid passageway 11 is closed with controlled restrictor 53, the pressure in the space 26 increases. Since the pressure in space 26 is higher than the pressure in space 25, the shaft 2, as a result of the different pressures acting on portion 44, will be caused to move in a first axial direction until there is full contact between the shaft 2 and the inner ring 16 of the ball bearing 19 in the area of the taper 40. Because of the presence of taper 40, simultaneous preloading in both radial and axial directions occurs. The amount of preloading can be controlled by the pressure of the oil in space 26 with controlled restrictor 53, by the air pressure in the space 25, and by the angle of the taper 40.

As an be seen from the foregoing discussion, in this regime, the spindle unit 100 works with a front ball bearing 19 and front and rear journal bearings 8 and 4. The load applied to the rear bearing 4 from a cutting process is many times lower as compared with the force applied to the front ball bearing 19. Because of the hydraulic preloading discussed above, the spindle unit 100 has a very high damping ratio in the axial direction - many times higher as compared with a usual ball bearing spindle. Further, thermal axial expansion is not dangerous for the bearings, even though it may change the spindle's parameters. The front journal bearing 8, which is preferably hydrostatic, adds its high damping ratio to the high stiffness of the preloaded front ball bearing 19.

Now turning to operation of the spindle unit in medium and high speed precision machining modes, in this mode of operation, the fluid passageway 10 is connected to tank 106 with the pressurized air, fluid passageways 11 and 12 are connected to oil tank 104 via low pressure return line 52, and fluid passageway 13 is connected to the tank 104 while the pump (not shown) in its flow line is operated to provide the oil at a high pressure. The space 26, in this mode of operation, functions like a thrust hydrostatic pad. Force from the pressure of the oil in space 25 creates the preloading for this hydrostatic pad. To provide maximal stiffness of the pad, there has to be the correct relationship between the supply pressure to the front bearing 8 and the supply pressure to the space 25. Because of the higher pressure in space 25, shaft 2, as a result of the differences in the pressures acting on portion 44, moves in a second axial direction away from the ball bearing 19 until it reaches a steady state position where it is disconnected from the inner ring 16 of the ball bearing 19. The location of the steady state position for the shaft 2 depends on the ratio of the supply pressure Ps of the flow restrictors 5 and 9 to the pressure in space 25. If the radial component of the clearance between the shaft 2 and the taper 40 of inner ring 16 is smaller than the radial clearance in the front journal bearing 8, the ball bearing assembly 19 acts as a highly effective safety device to prevent overloading of the front journal bearing. Pressurized air in the flow passageway 10 makes it possible for the gaps 20 and 21 to work without oil and therefore, reduce power consumption.

The spindle unit may be used in tools for the high speed milling of a workpiece or hard turning of the workpiece.

It should be appreciated that the present invention is not limited by the above-described embodiments and that changes and modifications can be made by one ordinarily skilled in the art without deviation from the scope of the invention as will be defined below in the appended claims.

It should also be appreciated that features disclosed in the foregoing description, and/or in the following claims, and/or in the accompanying drawings, and/or examples, and/or tables, may, both separately and in any combination thereof, be material for realizing the present invention in diverse forms thereof.

What is claimed is:

1. A spindle unit for use with a precision tool comprising:

a housing;

a shaft positioned within said housing and supported for rotation about a rotation axis; and fluid means for moving said shaft along said rotation axis to a first position where said spindle unit is able to work in a low speed regime and to a second position where said spindle unit is able to work in both a medium speed and a high speed regime.

2. The spindle unit according to claim 1, wherein said spindle unit further comprises two spaced apart journal bearings for supporting said shaft for rotation.

3. The spindle unit according to claim 1, wherein each of said journal bearings comprises an air-static bearing.

4. The spindle unit according to claim 2, wherein each of said journal bearings comprises a hydrostatic bearing.

5. The spindle unit according to claim 1, wherein said spindle unit further comprises a ball bearing assembly having an inner ring with a tapered surface.

6. The spindle unit according to claim 5, wherein said spindle unit has a tapered surface which corresponds to the tapered surface of the inner ring.

7. The spindle unit according to claim 5, wherein said fluid means includes a first space containing a fluid at a first pressure positioned on one side of a portion of the shaft and a second space containing a fluid at a second pressure positioned on a second side of said shaft portion and wherein during low speed operation said first pressure is greater than said second pressure and said shaft is moved towards said ball bearing assembly and during medium and high speed operation said second pressure is greater than said first pressure and said shaft is moved away from said ball bearing assembly.

8. The spindle unit according to claim 7, wherein said shaft is supported by two journal bearings and wherein in said medium and high speed operation said shaft assumes a steady state position which is a function of the ratio of the pressure of a fluid being supplied to said journal bearings to the pressure of the fluid in the second space.

9. The spindle unit according to claim 7, wherein during said low speed operation said first space contains oil under pressure and said second space contains pressurized air.

10. The spindle unit according to claim 7, wherein during said medium and high speed operation said first space contains pressurized air and said second space contains oil under pressure.

* * * * *

UNITED STATES PATENT AND TRADEMARK OFFICE
CERTIFICATE OF CORRECTION

PATENT NO. : 6,367,977 B1
DATED : April 9, 2002
INVENTOR(S) : Leonid Kashchenevsky It is certified that error appears in the above-identified patent and that said Letters Patent is hereby corrected as shown below:

<u>Title page,</u>
Item [57], ABSTRACT,
Line 2, "two" should read -- to --.

<u>Column 3,</u>
Line 19, "an" should read -- can --.

<u>Column 4,</u>
Line 28, "claim 1" should read -- claim 2 --.

Signed and Sealed this

Thirtieth Day of July, 2002

*Attest:*

JAMES E. ROGAN
*Attesting Officer*    *Director of the United States Patent and Trademark Office*